March 18, 1969        E. MENZI        3,433,374

POWER SHOVEL

Filed Aug. 25, 1966        Sheet 1 of 3

INVENTOR.
Ernst Menzi
BY
Kenyon, Palmer, Stewart & Estabrook

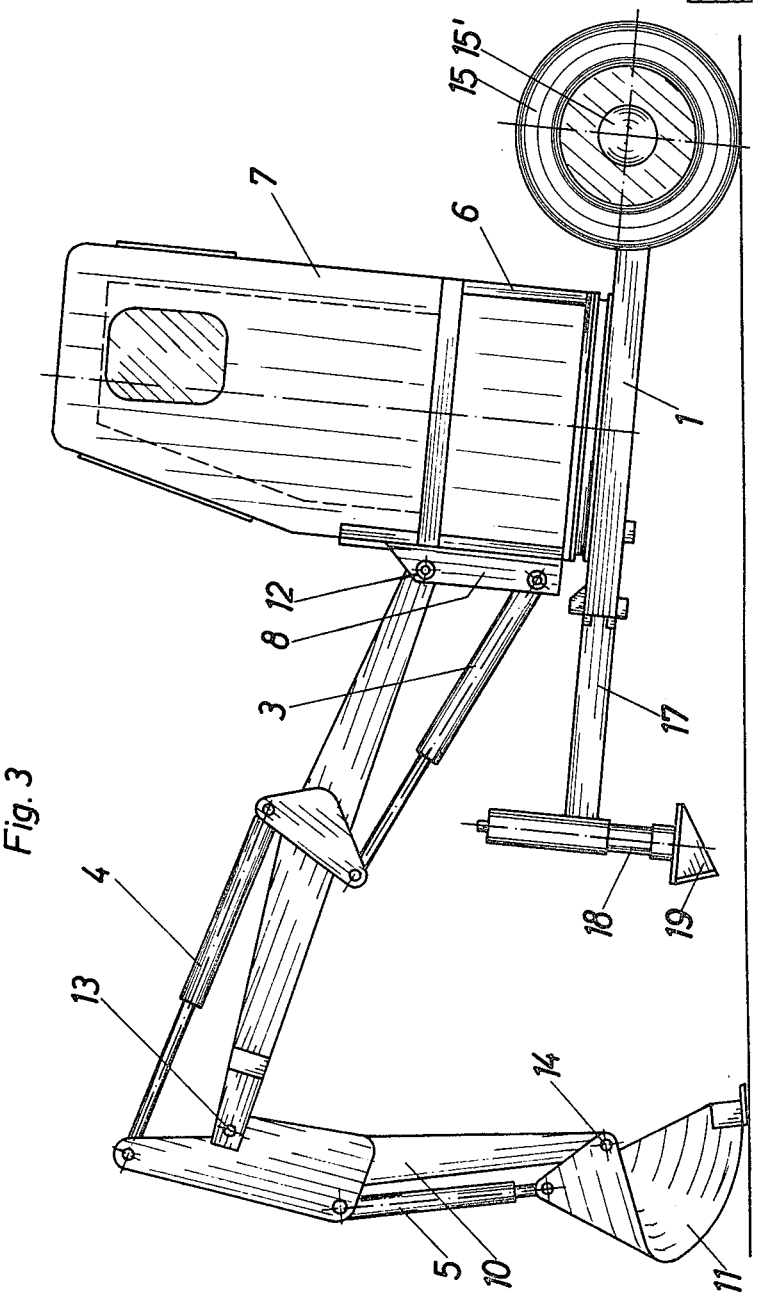

United States Patent Office 3,433,374
Patented Mar. 18, 1969

3,433,374
POWER SHOVEL
Ernst Menzi, Widnau, Landernaach, Switzerland, assignor to Ernst Menzi, Widnau, Landernaach, Switzerland, a sole proprietorship firm
Filed Aug. 25, 1966, Ser. No. 575,048
Claims priority, application Switzerland, Mar. 21, 1966, 4,046/66
U.S. Cl. 214—138                2 Claims
Int. Cl. E02f 3/50, 3/60

ABSTRACT OF THE DISCLOSURE

Bucket excavators of the type having a rotatable platform supported on a frame with the platform carrying an operator's cab and an overhang beam that supports a bucket and jib unit, the frame being in turn supported at one end by a pair of non-driven wheels and at the other end by horizontally swingable support legs, are improved by eliminating need for the usual counterbalance weights to avoid tipping of the excavator through critical dimensional relationship between platform pivot location, support wheel size and axle position and the overhang beam pivot location.

---

Figure 1:
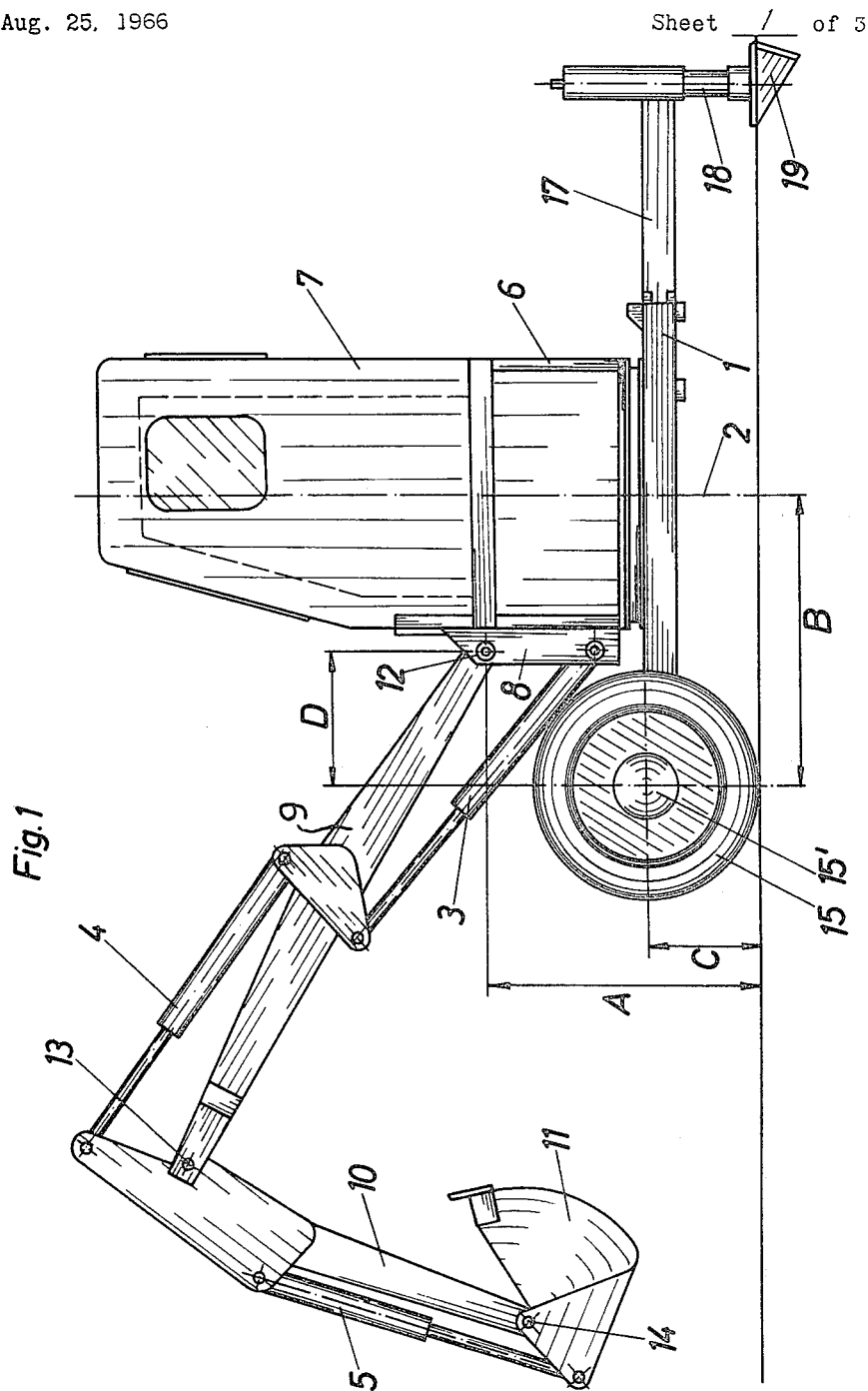

The invention purports to provide a bucket excavator of simple and robust construction capable of being used for removing all sorts of earth.

The invention is characterized in that the frame is supported on the ground on the one hand solely by a non-driven pair of wheels and on the other hand solely by a pair of support legs.

Another purpose of the invention is to give the excavator the maximum of stability so that the engine output may be exploited entirely for the sole benefit of the excavating performance, and so that even on difficult ground such as moorland or abrupt slopes the excavator may be capable of moving forward with the end of its overhand beam.

This result is obtained in that the ground clearance of the overhand beam swivel axis is less than, or at most equal to, the distance between the wheel axle and the platform pivot, and the ground clearance of the wheel axle amounts to at least one third of the ground clearance of the overhang beam swivel axis. This results in having the force which tends to uplift the whole excavator from the ground when the device is running effect the excavator from a low situated zone; furthermore, the elevated position of the wheel axle causes the centre of gravity of the excavator to lie in the zone of the horizontal plane defined by said wheel axle, so that even in the case of extreme stress it will not be necessary to provide supplemental ballast on the chassis. This is of particular importance considering that excavators of that kind are frequently used in bogs for emptying drainage ditches. Further, the relatively high position of the wheel axle allowing the use of wheels of large diameter so a relatively large bearing area will be available in the just mentioned eventuality which, as a rule, allows but a more or less small specific ground load.

If according to another characteristic feature of the invention the normal space between the vertical plane defined by the overhang beam swivel axis and the wheel axle is less than the wheel diameter the stability of the excavator will be improved since the effort arm determining the pitching moment about the wheel axle will still be of small extension even by far outstretching of the overhang beam.

It is a characteristic of excavators of the kind just described that they can move forward with the aid of the overhang beam by urging the fore part of said overhang beam onto the ground till the chassis is uplifted, whereupon the overhang beam is retracted. In other excavators like those already known operating in hilly regions such faculty of advancing on its own means is precluded in oblique position as the overhang beam braced on the ground is likely to slip off when retracted. The invention eliminates this inconvenience by making the normal space between the platform pivot and the wheel axle to be twice the normal space between the wheel axle and the vertical plane defined by the overhang beam swivel axis.

The invention will now be explained more in detail with respect of an embodiment illustrated by the accompanying drawings, it being understood that the scope of the invention is not to be restricted otherwise than by the appended claims.

Figure 2:
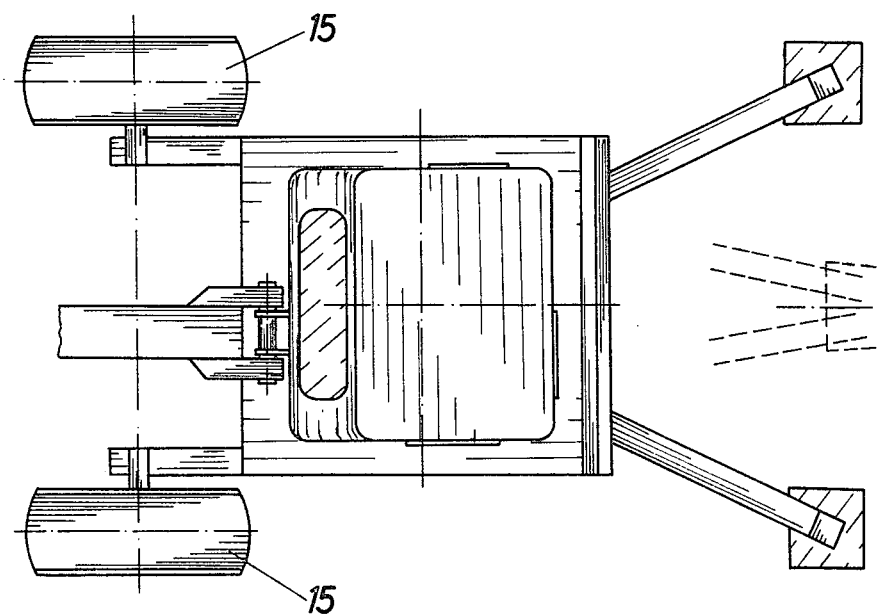

FIG. 1 is a side view of the excavator in working state;
FIG. 2 is a plan view of the same excavator;
FIG. 3 shows the excavator moving forward on its own means.

The excavator according to the invention comprises a frame 1 and a rotary platform 6 which support a motor unit supplying the force for the hydraulic equipment actuating hoise cylinders 3, 4, 5. Said platform 6 is rotatable round a vertical axis 2 and comprises an operator cabin 7 situated above the motor unit. Connected to said platform 6 is a support member 8 on which a beam 9 is mounted so as to be swingable about a horizontal pivot 12. The free end of a jib 10 holds a bucket 11. Beam 9 swings round horizontal pivot 12; jib 10 with hoise cylinder 4 swings round a pivot 13 and the bucket 11 swings round a pivot 14 with hoist cylinder 5. The control gear for said hydraulic cylinders is actuated from the operator cabin 7.

The frame 1 is supported on the one hand by a pair of wheels 15, and on the other hand by a member 17 connected to vertically slidable support legs 18. The latter are provided at their lower end with jags 19 which dig themselves in the ground. The wheels 15 stand under no driving means. When the excavator has to be transported over a long distance the members 17 are swung towards one another (FIG. 2) and the excavator is hauled along by some tow vehicle over suitable coupling means.

Regarding the excavator described in the foregoing it is essential that the ground clearance A of the swinging plane 12 of the overhang beam be less than the normal space B between the wheel axle 15' and the pivot 2 of the platform 6, whereby the ground clearance C of the wheel axle 15' should amount to at least one third of ground clearance A. In order to have a small rocker arm with respect of the wheel axle 15' even by far outstretched overhang beam it will be suitable that the normal space D between the vertical plane defined by the overhang beam swivel axis 12 and the wheel axle 15' be less than the diameter of the wheels 15.

With the aid of the bucket and of the overhang beam the excavator can move forward stepwise over a short stretch. To that end the platform is swung 180° from the position in FIG. 1. The thus reached position is visible in FIG. 3. By actuating the hoisting sets 3–5 firstly beam 9 and jib 10 are shifted into an approximately perpendicular position and the bucket is put down on the ground. A further actuation of the double-working hydraulic unit 3 causes the frame 1 together with the support legs 18 to be uplifted, whereupon the excavator moves forward by rolling on the wheels 15 as the hydraulic unit 4 is being actuated, whereby the bucket substantially keeps on being hooked in the earth. Under such conditions excavations may be performed in boggy grounds by using the device according to the invention, a task which excavators of the known type would be unable to carry out. Moreover, there is no need for the operator to leave his cabin to assure the further driving of the excavator. If the excavator should be apt to move normally notwithstanding occurring slopes and without any slipping off of the bucket when the hoisting cylinder 4 is actuated, it is essential that the normal space B between pivot 2 of platform 6 and wheel axle 15' be twice the normal space D between wheel axle 15' and the vertical plane defined by the overhang beam swivel axis.

It is further possible to perform excavation work in any rotary position within the radius of turn of the bucket, the preferred position being, however, the one illustrated in FIG. 1 where the overhang beam moves up and down between the wheels.

The bucket 11 may be fixed to the jib 10 so as to be interchangeable, including the possibility of choosing the bucket best adapted to the circumstance.

Should the excavator be loaded on a truck in order to be transported to some other distant place this may occur without using any auxiliary means such as hoisting devices, loading ramps and the like, for the excavator is quite capable of hoisting itself up onto the truck platform. The truck having been driven alongside the excavator, namely along the wheel side, the overhang beam is actuated with admission of pressure oil till both wheels are on a level with the truck platform. Then the truck is driven towards the excavator till both wheels arrive on the platform, whereupon the overhang beam is released and put down on the ground after being swung by 180°. Now the overhang beam cylinders are put under pressure again elevating the whole frame, and the excavator rolls on on the truck platform by suitable actuation of the overhang beam.

What I claim is:

1. An excavator comprising a frame, a platform supported by said frame for rotation about a verticle axis, a bucket and jib unit comprising an overhang beam having a horizontal pivot axis at its inward end, a support member carried by said platform to pivotally support said beam at said pivot axis, said frame being provided at one end with an axle, a pair of non-driven wheels carried upon said axle, a pair of support legs carried by said frame at the end opposite to said axle, the distance between said vertical axis and said axle being greater than twice the distance between said axle and a vertical plane extending through said pivot axis, the distance between said vertical plane and said axle being not greater than the diameter of said wheels, the distance between the horizontal plane through said pivot axis and the horizontal plane tangent to the lowest extension of said wheels being less than the distance between said vertical axis and said axle, and the radius of said wheels being at least one third the distance between said tangential horizontal plane and a horizontal plane through the pivot axis.

2. An excavator as claimed in claim 1 wherein said support legs are fixed to horizontally swingable members permitting the support legs to rotate in a plane parallel to the longitudinal plane of said frame.

References Cited

FOREIGN PATENTS

| | | |
|---|---|---|
| 1,051,801 | 9/1953 | France. |
| 1,103,692 | 5/1955 | France. |
| 1,005,704 | 4/1957 | Germany. |
| 1,172,820 | 6/1964 | Germany. |
| 774,162 | 5/1957 | Great Britain. |
| 852,925 | 11/1960 | Great Britain. |

HUGO O. SCHULZ, *Primary Examiner.*